United States Patent
Destain (10) Patent No.: US 8,540,375 B2
(45) Date of Patent: Sep. 24, 2013

(54) OFFSET PROJECTION DISTORTION CORRECTION

(75) Inventor: Patrick Rene Destain, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 403 days.

(21) Appl. No.: 11/948,811

(22) Filed: Nov. 30, 2007

(65) Prior Publication Data
US 2009/0141250 A1    Jun. 4, 2009

(51) Int. Cl.
*G03B 21/00* (2006.01)
*G03B 21/14* (2006.01)

(52) U.S. Cl.
USPC ............................................. 353/70; 359/456

(58) Field of Classification Search
USPC ............... 353/69–72, 101; 359/668–671, 359/443, 449, 451, 456, 460
See application file for complete search history.

(56) References Cited

U.S. PATENT DOCUMENTS

| | | | |
|---|---|---|---|
| 5,622,417 A * | 4/1997 | Conner et al. | 353/69 |
| 5,820,240 A * | 10/1998 | Ohzawa | 353/70 |
| 6,416,186 B1 * | 7/2002 | Nakamura | 353/69 |
| 6,520,643 B1 * | 2/2003 | Holman et al. | 353/20 |
| 6,520,646 B2 | 2/2003 | Rodriguez et al. | |
| 6,568,814 B2 | 5/2003 | Rodriguez et al. | |
| 6,857,750 B2 | 2/2005 | Shimizu | |
| 6,877,863 B2 | 4/2005 | Wood et al. | |
| 6,877,864 B1 * | 4/2005 | Tamura et al. | 353/70 |
| 6,994,437 B2 | 2/2006 | Suzuki et al. | |
| 7,262,816 B2 | 8/2007 | McDowall et al. | |
| 2001/0017687 A1 * | 8/2001 | Rodriguez et al. | 353/70 |
| 2004/0233394 A1 * | 11/2004 | Gohman | 353/70 |
| 2005/0168704 A1 * | 8/2005 | Gupta et al. | 353/69 |
| 2007/0165191 A1 * | 7/2007 | Shimada | 353/70 |

\* cited by examiner

*Primary Examiner* — Francis M Legasse, Jr.
(74) *Attorney, Agent, or Firm* — Warren L. Franz; Wade J. Brady, III; Frederick J. Telecky, Jr.

(57) ABSTRACT

A system and method for correcting optical distortion in an off-axis system is provided. The offset between the center of a display plane and the optical axis of the projection lens system is configured such that the offset is greater than half the vertical dimension of the display plane. In this manner, the distortion, such as a pincushion-type or barrel-type of distortion, is not symmetrical about the horizontal axis. In this scenario, the display plane, the projection lens system, a folding mirror, and/or the spatial light modulator may be tilted such that a keystone effect is induced. This keystone effect may be used to offset the distortion, particularly the pincushion-type or barrel-type of distortions.

9 Claims, 9 Drawing Sheets

OFFSET PROJECTION DISTORTION CORRECTION

TECHNICAL FIELD

Embodiments relate generally to the field of projection display systems and methods, and more particularly, to distortion correction in an off-axis projection display system.

BACKGROUND

Projection displays are used for a wide variety of applications, such as producing the pictures viewed on television screens. A typical projection display system includes a number of components, including a display screen, a light source, and an optical path between them. To create the pictures, one or more light sources are provided to emit light when it is needed. The light they produce is then manipulated by a series of optical devices in order to create the visual image. The visual image created along the optical path is then displayed on the display screen, the television screen for example, or another visual display. In most cases, the goal is to produce the best picture possible. The key to producing a desirable visual display, of course, is the configuration of the various optical devices along the optical path. The selection, operation, and configuration of these devices also contribute to unseen characteristics of the system, such as cost, size, and efficient use of system resources.

Several types of projection displays have recently been developed. These new display systems are now becoming much more common, serving as a replacement for the widely-used CRT (cathode ray tube) display, which produces a visual image by producing and directing a stream of electrons at a treated display surface. The stream could only be directed to one point at any given time, but can be systematically swept across the display with such speed as to create the visual impression of a single image. This technology is fairly well-developed, but has reached the point where perceptible increases in quality are difficult to achieve. A CRT also takes up a relatively-large amount of space because the components used for generating the electron stream must be placed at a certain distance from the display screen. Many recently-developed projection display systems, in contrast, feature a much slimmer profile. In addition, projection display systems often produce much cleaner visual images. The combination of these advantages has made such systems immensely popular.

One such projection-display system is commercially available from Texas Instruments of Dallas, Tex. under the trademark DLP® (or Digital Light Processing®). DLP® projection-display systems utilize a digital micromirror device (DMD) in their optical path. The DMD typically includes an array of thousands of tiny mirrors that are used to manipulate colored light originating at an internal light source. Lenses and other components in the optical path adjust the light for use by the DMD, or convey the image it generates to a display plane. The colored light is reflected by the DMD and projected onto a display plane for viewing according to an input image. Projection lenses may be used to magnify and/or focus the image on the display plane.

The general trend in the industry is toward thinner and lighter displays comparable to those available with flat-panel display systems, such as liquid crystal display systems and plasma display systems. In an attempt to develop thinner projection display systems such as those discussed above using a DMD, a combination of lenses and mirrors are used to create a shorter throw distance, which is required for a larger display, within a thinner cabinet form factor. In these systems, the DMD is off axis such that light reflected off the DMD is directed toward a folding mirror that reflects the light from the DMD toward the display plane. By folding the light path, an actual distance traversed by a light beam may be maintained while a physical dimension between the light source and the display plane may be shortened, thereby allowing a longer throw distance, and accordingly a greater magnification, within a given space.

Front projection systems, such as a ceiling mounted projection system, may also utilize a DMD configured off axis relative to the optical axis. In some of these embodiments, particularly a ceiling mounted projection system, the throw distance is typically longer than in rear projection systems.

Placing the DMD off axis, however, increases the projection lenses' instantaneous FOV and, therefore, increases the effect of any aberration of the displayed image, such as astigmatism, lateral color variations, and distortion.

Attempts to correct the image distortion have focused on the use of complicated and expensive optics. Generally, lenses and mirrors having specific and exacting specifications may be used to a certain extent to shape the image, thereby correcting some of the distortions of the image. These optics, typically aspheric molded plastic with complex shapes, are expensive and complicated to fabricate. Furthermore, because the optics must be precisely located along the optical path, many times the cost of production is exceedingly high, thereby becoming uncompetitive with other display technologies.

SUMMARY OF THE INVENTION

These and other problems are generally solved or circumvented, and technical advantages are generally achieved, by embodiments of the present invention that provide a system and a method for correcting distortion in an off-axis projection display system.

In accordance with an embodiment, an image projection system is provided. The image projection system includes a projection system and a display. The projection system has a first optical axis that is offset from an optical axis of the display by at least half the height of the display. The optical axes of the projection system and the display are non-parallel. Embodiments may be used to correct various types of distortion, including pincushion and barrel distortion. Embodiments may include one or more folding mirrors positioned to reflect light from the projection system to the display within a shorter distance. In some embodiments, the projection system and the display are rotated together such that a normal viewing angle may be maintained.

In accordance with another embodiment, a method of providing a rear projection system is provided. A projection lens system is provided such that the projection lens system projects an image along a first optical axis. A display plane is provided that is tilted such that the optical axis of the display plane is non-perpendicular to the first optical axis. Embodiments may include one or more folding mirrors for directing the image from the projection lens onto the display plane within a shorter distance. The display plane may be provided such that the tilt of the display plane causes a negative keystone effect or a positive keystone effect. The projection system and the display may also be provided such that a viewing angle normal to the display plane is maintained.

In accordance with yet another embodiment, an off-axis rear projection system is provided. The off-axis rear projection system includes a housing having a projection lens system and a display plane. The projection lens system projects an image configured to project an image along a first optical axis of an optical path to the display plane. The display plane is non-orthogonal to the first optical axis.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Generally, embodiments of the present invention intentionally induce one type of distortion in order to compensate for another type of distortion, thereby attempting to project an image exhibiting less overall distortion or distortion that is less noticeable to a viewer. In particular, embodiments described herein have been found to be particularly effective for compensating a projected image exhibiting in third order residual distortion, preferably without parabolic compensation. For example, images exhibiting a pincushion-type of distortion or a barrel-type of distortion may be greatly improved by intentionally inducing a keystone distortion having an opposite relative orientation. As discussed in greater detail below, the keystone compensation, either negative or positive, may be induced by tilting the display screen, tilting the projection lens, tilting the spatial-light modulator, tilting a folding mirror, or a combination thereof. While specific embodiments of these are discussed below, it should be noted that other combinations may be used.

The embodiments will be described in a specific context, namely a DMD-based projection display system. Embodiments may also be applied, however, to projection display systems, in general, and specifically to other microdisplay-based projection display systems, such as those utilizing transmissive or reflective liquid crystal displays, liquid crystal on silicon, ferroelectric liquid-crystal-on-silicon, deformable micromirrors, and so forth. Furthermore, while embodiments will be described with reference to DMDs, other spatial light modulators may be used.

Figure 1A:
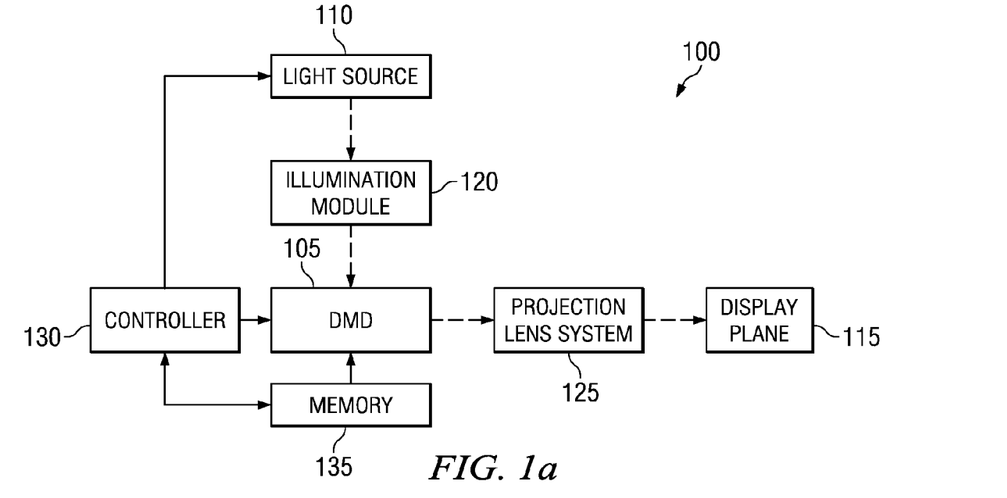
FIGS. 1a-1d are diagrams of different views of an exemplary DMD-based projection display system.

With reference now to FIGS. 1a-1d there are shown diagrams illustrating views of an exemplary DMD-based projection display system. The diagram shown in FIG. 1a illustrates a high-level view of a DMD-based projection display system 100, which includes a DMD 105 that modulates light produced by a light source 110. The DMD 105 is an example of a microdisplay. Other examples of microdisplays may include transmissive or reflective liquid crystal, liquid crystal on silicon, deformable micromirrors, and so forth. In a microdisplay, an array of light modulators may be arranged in a rectangular, square, diamond shaped, and so forth, array. Each light modulator in the microdisplay may operate in conjunction with the other light modulators to modulate the light produced by the light source 110. The light, modulated by the DMD 105, may be used to create images on a display plane 115. The DMD-based projection display system 100 also includes an illumination module 120, which may be used to collimate and shape the light produced by the light source 110 as well as collect stray light, and a projection lens system 125, which may be used to manipulate (for example, focus and magnify) the light reflecting off the DMD 105.

The DMD 105 may be coupled to a controller 130, which may be responsible for loading image data into the DMD 105, controlling the operation of the DMD 105, controlling the light produced by the light source 110, and so forth. A memory 135, which may be coupled to the DMD 105 and the controller 130, may be used to store the image data, as well as configuration data, color correction data, and so forth.

Figure 1B:
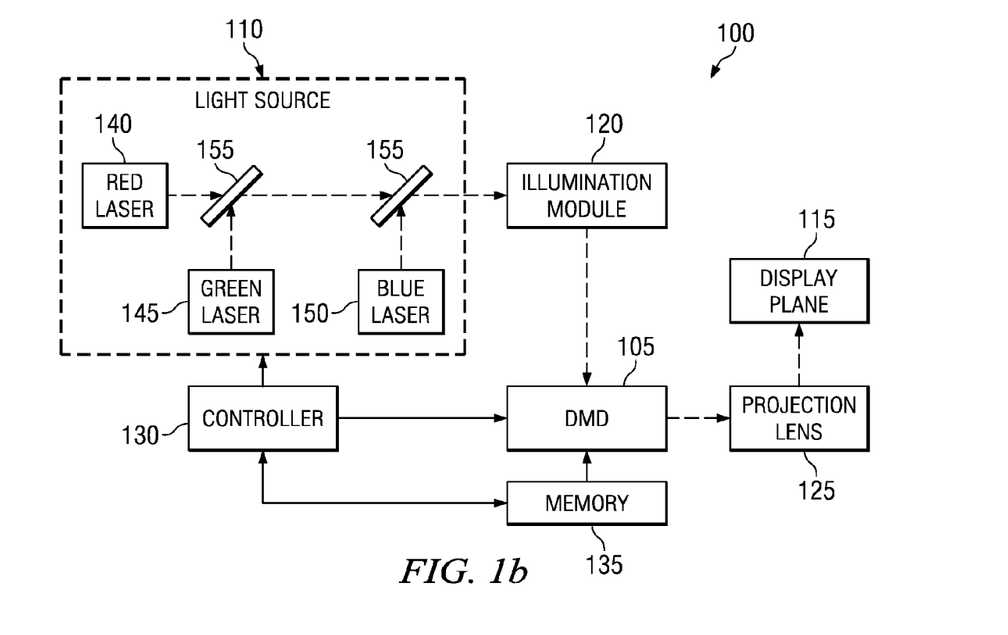

The diagram shown in FIG. 1b illustrates a high-level view of the DMD-based projection display system 100 with added emphasis on the light source 110 in accordance with an embodiment in which laser light is utilized as a light source. The light source 110 of the DMD-based projection display system 100 may utilize a plurality of lasers to produce coherent light at different wavelengths. A red laser 140, for example, may produce coherent light in the red color spectrum. Similarly, a green laser 145 and a blue laser 150 may produce coherent light in the green and blue color spectra, respectively. The light source 110 may include dichroic filters 155. The dichroic filters 155 reflect light of certain frequencies while they transmit light at other frequencies. The dichroic filters 155 may be used to combine the coherent light produced by the multiple lasers into a single light path directed to the illumination module 120.

Figure 1C:
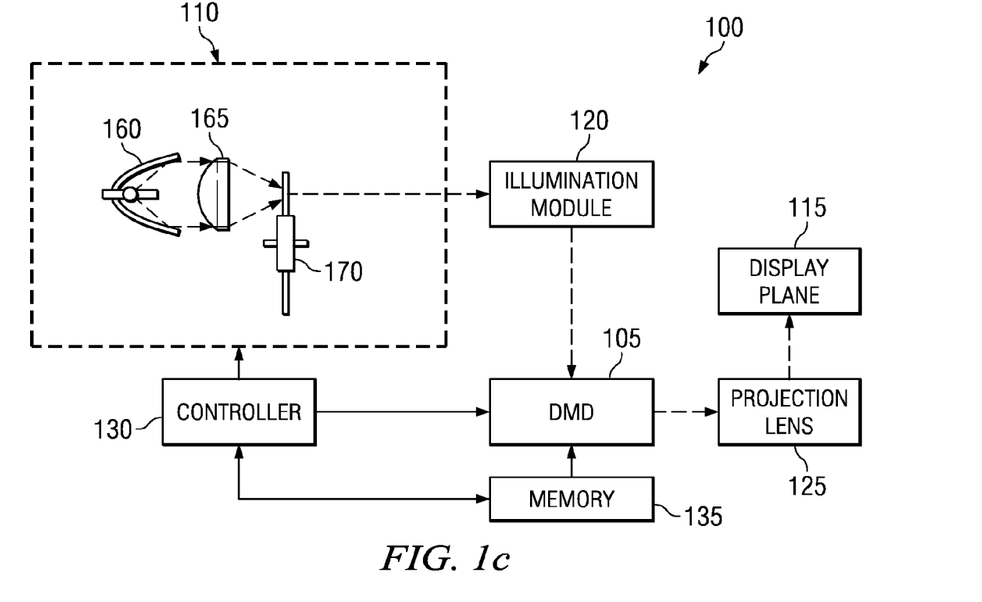

The diagram shown in FIG. 1c illustrates a high-level view of the DMD-based projection display system 100 with added emphasis on the light source 110 in accordance with another embodiment in which a lamp is utilized as a light source. In this embodiment, white light from high-intensity lamps, such as UHP arc lamps, is converted into primary wavelengths (such as red, green, and blue) by a sequence of filters arranged on a spinning disc or color wheel. This light source 110 comprises a high-intensity lamp assembly 160 (the illumination source), condenser lens 165 and a rotating color filter wheel assembly 170. The spinning disc or color wheel 170 sequentially exposes the single DMD device to the filtered light from the high-intensity lamp to produce a colored image.

In operation, the optical architecture illustrated in FIG. 1c focuses white light from the lamp assembly 160 onto a small spot on the surface of the color filter wheel assembly 170 by means of the condenser lens 165. The illumination module 120 may include an integrator rod (not shown) to integrate sequential color light (such as red, green, and blue) coming through the color wheel in the rotating color filter wheel assembly 170 to produce a uniform light beam. The resulting beam is shaped and directed to the DMD 105.

Figure 1D:
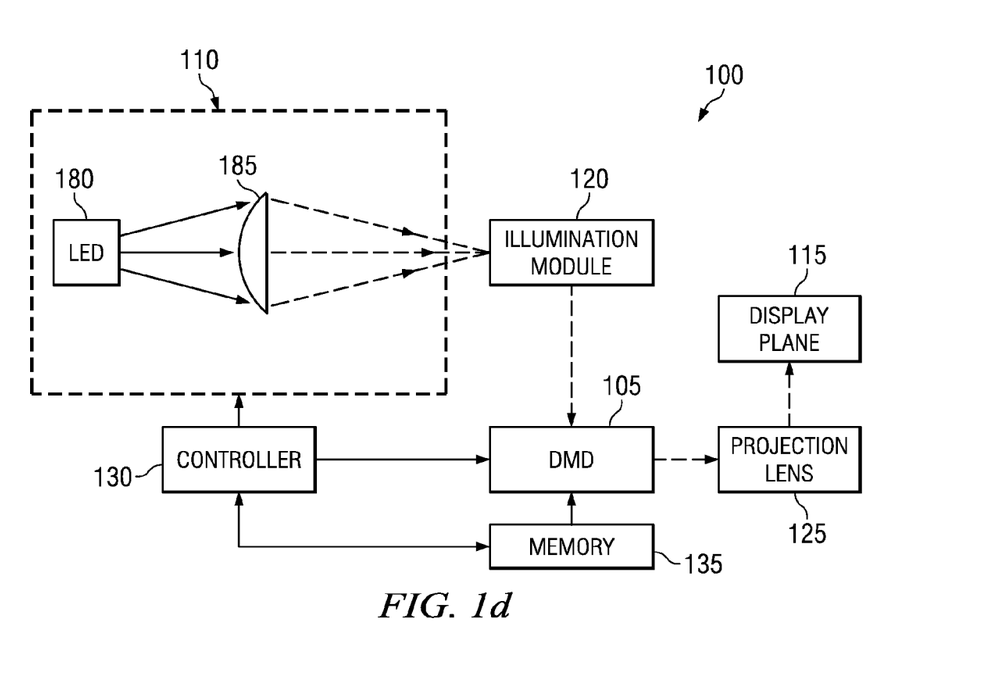

The diagram shown in FIG. 1d illustrates a high-level view of the DMD-based projection display system 100 with added emphasis on the light source 110 in accordance with another embodiment in which one or more LEDs is utilized as a light source. In this embodiment, one or more LEDs emitting different colors (referenced generally as LEDs 180), such as a red-light emitting LED, a blue-light emitting LED, and a green-light emitting LED, toward a condenser lens 185. In some applications, it may be desirable to utilize multiple LEDs for each color to increase the brightness of the resulting image on the display plane 115.

It should be noted that the embodiments illustrated in FIGS. 1a-1d are provided for illustrative purposes only, and that other configurations may be used. For example, other light sources, lens systems, mirrors, and the like may be used. Furthermore the number of each individual component may vary. For example, the number and colors included in the light source may vary, the number and size of the DMD may vary, and the like.

Figure 2A:
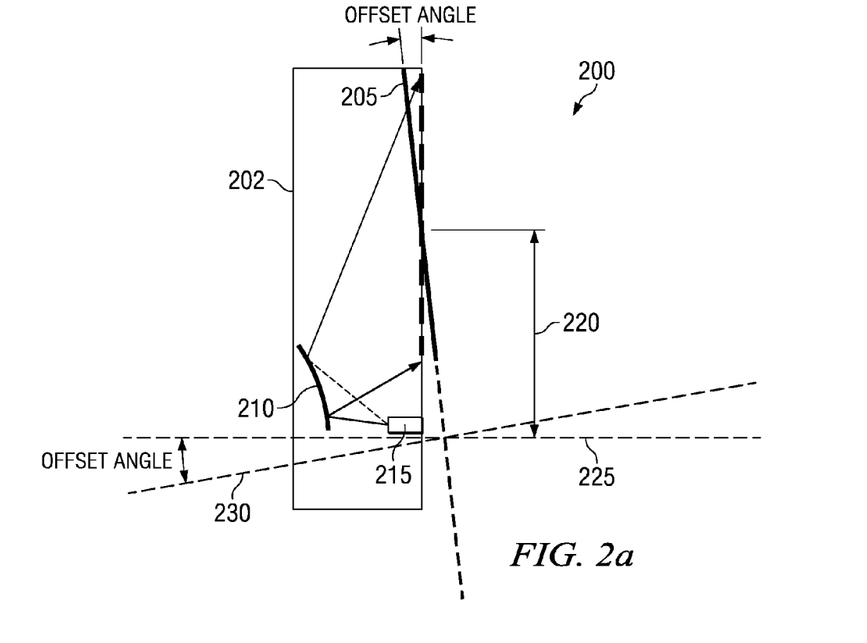
FIGS. 2a and 2b illustrate an off-axis rear projection system in accordance with an embodiment to account for an image having pincushion distortion.

With reference now to FIG. 2a, there is shown a diagram illustrating an exemplary rear-projection display system 200 in accordance with an embodiment. The projection display system 200 includes a housing 202 enclosing a display plane 205, a folding mirror 210, and a projection system 215. Embodiments of the projection system 215 that may be used in conjunction with the rear-projection display system 200 are discussed above with reference to FIGS. 1a-1d. The display plane 205 may be a composite screen made up of one or more components, including a Fresnel lens portion and a lenticular layer. The folding mirror 210 reflects projected light from the projection system 215 onto the display plane 205.

The folding mirror 210 allows for a reduction in the depth of the projection display system 200 by folding the projected light over onto itself, thereby reducing the extent of the physical size required for the same light path length. It should be noted that the folding mirror 210 is illustrated as a single curved mirror solely for the purposes of illustration and that the folding mirror 210 may comprise one or more curved (spherical or aspherical) or linear mirrors in other embodiments.

The rear-projection display system 200 preferably has an optical offset 220 that is about one-half the vertical height of the display plane or greater. In an embodiment, the optical offset 220 is about 95%, but more preferably about 105%. The optical offset 220 is generally the difference between an optical axis of the projection system 215 (referred to herein as a projection optical axis 225) and the center of the display plane 205 and may be specified as a distance value or as a percentage of the size of the display plane 205.

Figure 2B:
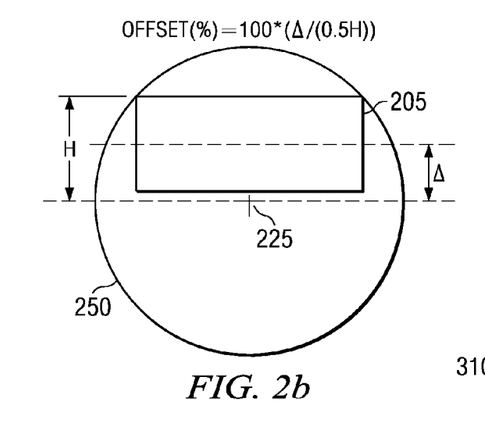

FIG. 2b illustrates the relationship between the on-axis field of view 250 and the display plane 205. Mathematically, as illustrated in FIG. 2b, the optical offset 220 may be determined as a percentage of the size of the display plane 205 according to the following equation:

$$OpticalOffset(\%) = \frac{100 * \Delta}{H/2};$$

where: $\Delta$ is the distance from the center of the display plane to the optical axis of the projection system 215; and
H is the total height of the display plane 205.

Also illustrated in FIG. 2a, the display plane 205 is tilted relative to a plane orthogonal to the projection optical axis 225 of the projection system 215 and any folding mirrors, such as folding mirror 210. As a result of tilting the display plane 205, the optical axis of the display plane 205 (referred to herein as the display optical axis 230) is no longer parallel to the projection optical axis 225.

Figure 3:
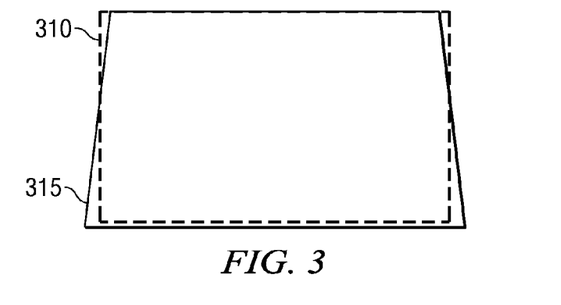
FIG. 3 illustrates a negative keystone distortion in accordance with an embodiment of an off-axis rear projection display system.

The effect of tilting the display plane 205 in this manner is to induce a negative keystone distortion as illustrated in FIG. 3, wherein the dotted line 310 represents a reference shape of the displayed image before tilting the display plane 205, and the solid line 315 illustrates the effect of tilting the display plane 205 relative to the reference shape 310 on the displayed image. Accordingly, tilting of the display plane 205 as illustrated in FIG. 2a creates a negative keystone distortion. In an embodiment in which a 44-inch display plane (16:9 widescreen format) and a 0.45 DMD is utilized, the display plane 205 is tilted about 0.12 degrees with reference to the plane normal to the optical axis of the projection system 215. Other offsets may be utilized and other display plane sizes and DMD sizes may utilize different offsets.

Figure 4:
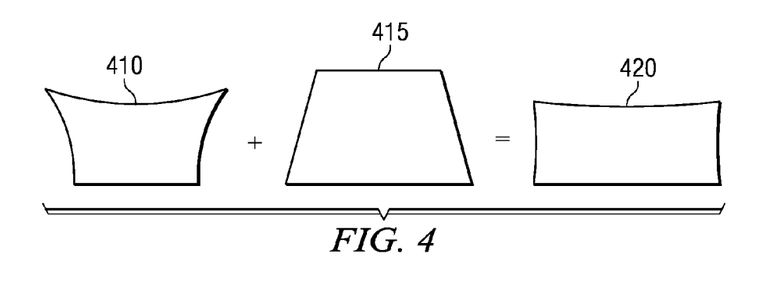
FIG. 4 illustrates the effect of a negative keystone distortion applied to an image having pincushion distortion in accordance with an embodiment of an off-axis projection display system.

This effect is further illustrated in FIG. 4. Reference numeral 410 is a graphical representation of a pincushion distortion that may occur in a projection display system such as that illustrated in FIGS. 1a-2. One of ordinary skill in the art will appreciate that the pincushion distortion 410 may be roughly symmetrical about a center vertical axis, but is not symmetrical about a horizontal axis due to the optical offset 220 of the rear-projection display system 200.

Reference numeral 415 illustrates the negative keystone distortion that is achieved by the tilting of the display plane 205 as described above. The combined effect, which is indicated by reference numeral 420, is to substantially compensate for the pincushion effect. It should be noted that the sides of the display plane 205 may not be completely linear, but that the pincushion distortion has been significantly compensated for by the tilting of the display plane 205.

Figure 5:
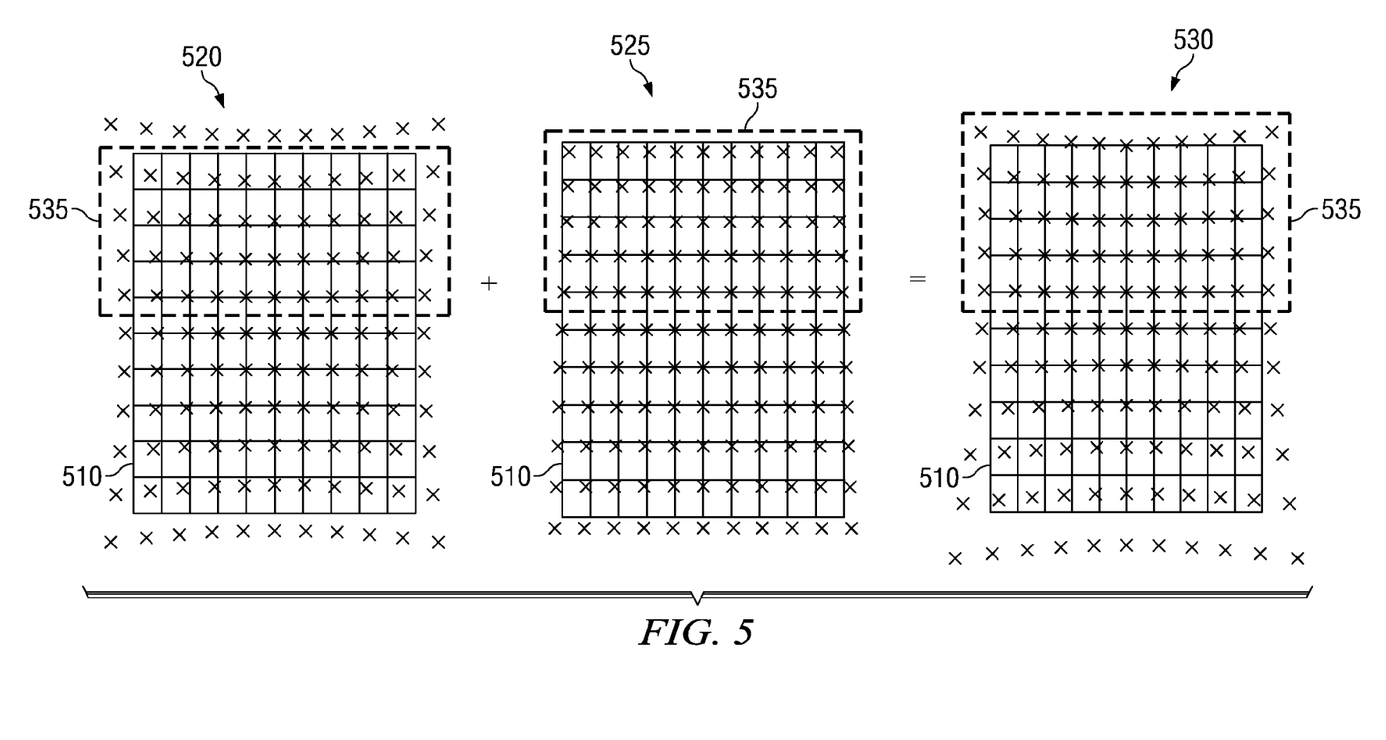
FIG. 5 is another illustration of the effect of a negative keystone distortion applied to an image having pincushion distortion in accordance with an embodiment of an off-axis projection display system.

This effect is further illustrated in FIG. 5, which illustrates results that may be achieved with an embodiment. FIG. 5 illustrates a set of rectangular grids 510, wherein the intersections of horizontal and vertical lines represent the desired locations of pixels given no distortion and each "x" represents the actual location of the corresponding pixels.

As illustrated in a pincushion distortion plot 520, the actual location of the pixels is offset from the desired locations in a pattern similar to the pincushion distortion illustrated in FIG. 4. A negative keystone correction plot 525 illustrates the actual pixel locations of the negative keystone correction illustrated in FIG. 4. As illustrated in a corrected plot 530, applying the negative keystone effect as illustrated by the negative keystone correction plot 525 to the pincushion distortion plot 520 causes the actual pixel locations to be substantially aligned in parallel vertical lines.

Also illustrated in FIG. 5 is the use of only the off-axis portion of the display. The pincushion distortion plot 520 illustrates the generally symmetrical nature of the pincushion distortion along both the horizontal and vertical axes. A dotted rectangle 535 indicates that portion of the image that will be displayed on the display plane 205 due to the off-axis alignment of the projection system 215 and the display plane 205 (see FIG. 2). The lower portion (the portion below the dotted rectangle 535) is not displayed on the display plane 205.

It should be noted that the actual pixel locations in the corrected plot 535 are still distorted along the horizontal axis after the negative keystone correction has been applied, and in some scenarios, the total distortion may actually be greater after applying the negative keystone correction than before. However, the actual pixel locations after applying the negative keystone correction are aligned in substantially parallel lines, although the spacing between the lines may vary. It has been found that viewers are not as sensitive to this type of distortion—viewers do not notice parallel lines having an inconsistent spacing as readily as non-parallel lines.

Figure 6:
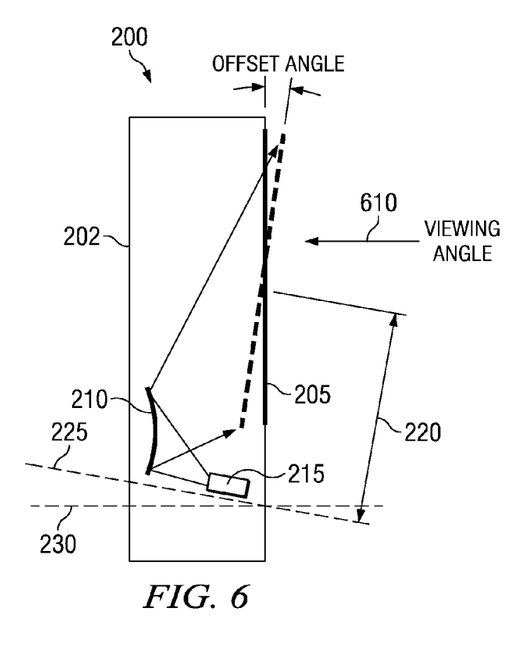
FIG. 6 illustrates an off-axis rear projection system having a viewing angle orthogonal to the display plane in a housing in accordance with an embodiment.

FIG. 6 illustrates an embodiment similar to the embodiment discussed above with reference to FIG. 2a, wherein like reference numerals refer to similar elements. The tilt angle between the display plane 205 and the projection system 215 is relative. Accordingly, one or both of the projection system 215 (along with the folding mirror 210) and the display plane 205 may be tilted relative to each other to effect a negative keystone correction. For example, in an embodiment, the projection system 215 (along with the folding mirror 210) is tilted relative to the display plane 205 without tilting the display plane 205. In another embodiment, the projection system 215 is not tilted, but rather the display plane 205 is tilted. In yet another embodiment, both the display plane 205 and the projection system 215 is tilted to effect the negative keystone correction.

In the embodiment illustrated in FIG. 6, the projection system 215 and the display plane 205 have both been rotated relative to the embodiment illustrated in FIG. 2a in order to maintain a display surface having a substantially normal viewing angle, as indicated by reference numeral 610. This embodiment is equivalent to maintaining the display plane 205 in the typical position to maintain a viewing angle normal to the display plane 205 and tilting the projection system 215 relative to the display plane 205.

These concepts may be applied to other types of distortions as well. For example, embodiments may be used to correct images in systems exhibiting a barrel distortion. Barrel distortion causes a distorted image that is wider along the center horizontal axis than the lower and upper regions, and has a generally curved border. For this type of distortion, it is preferred to apply a positive keystone correction.

Figure 7:
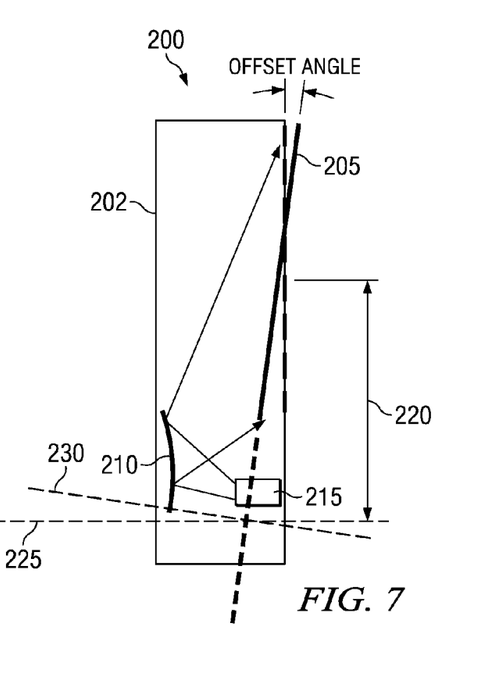
FIG. 7 illustrates an off-axis rear projection system in accordance with an embodiment to account for am image having barrel distortion.

FIG. 7 illustrates an embodiment that may correct an image exhibiting barrel distortion. FIG. 7 is similar to FIG. 2a wherein like reference numerals refer to like elements, except that the display plane 205 is rotated in an opposite direction from the embodiment correcting an image exhibiting pincushion distortion. In this scenario, a positive keystone correction is applied rather than a negative keystone correction.

Figure 8:
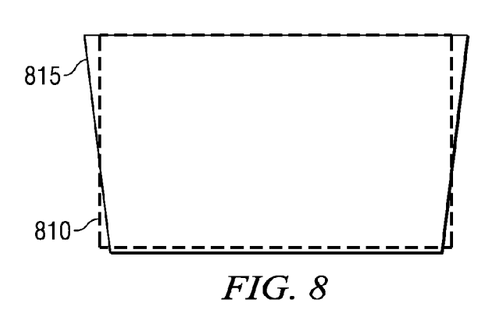
FIG. 8 illustrates a positive keystone distortion in accordance with an embodiment of an off-axis rear projection display system.

FIG. 8 illustrates the effect of tilting the display plane 205 as depicted in FIG. 7. The dotted line 810 represents a reference shape of the displayed image before tilting the display plane 205, and the solid line 815 illustrates the effect of tilting the display plane 205 relative to the reference shape 810 on the displayed image. Accordingly, tilting the display plane 205 as illustrated in FIG. 7 creates a positive keystone distortion. In an embodiment in which a 44-inch display plane (16:9 widescreen format) and a 0.45 DMD is utilized, the display plane 205 is preferably tilted about 0.12 degrees with reference to the plane normal to the optical axis of the projection system 215. Other offsets may be utilized and other display plane sizes and DMD sizes may utilize different offsets.

Figure 9:
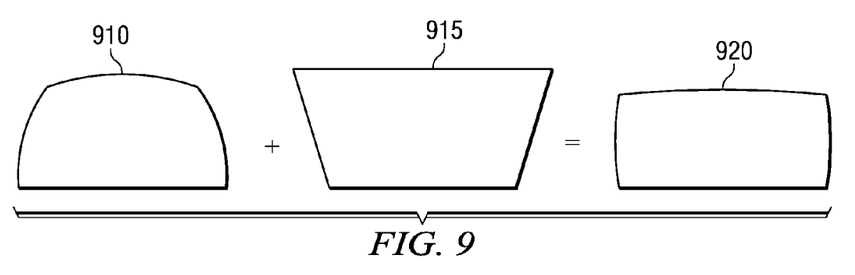
FIG. 9 illustrates the effect of a positive keystone distortion applied to an image having barrel distortion in accordance with an embodiment of an off-axis projection display system.

FIG. 9 illustrates the effect of the positive keystone correction on the displayed image. Reference numeral 910 is a graphical representation of barrel distortion that may occur in a projection display system such as that illustrated in FIGS. 1a-2a. While a barrel distortion is generally symmetrical about a horizontal and vertical axis, the barrel distortion of the displayed image in this embodiment is not symmetrical about a horizontal axis because of the optical offset 220.

Reference numeral 915 illustrates the positive keystone distortion that is achieved by the tilting of the display plane 205 as described above with reference to FIG. 7. As illustrated by the combined effect as indicated by reference numeral 920, the effect is to substantially compensate for the barrel distortion. It should be noted that the borders of the displayed image on the display plane 205 may not be completely linear, but that the barrel distortion has been significantly compensated for by the tilting of the display plane 205.

Figure 10:
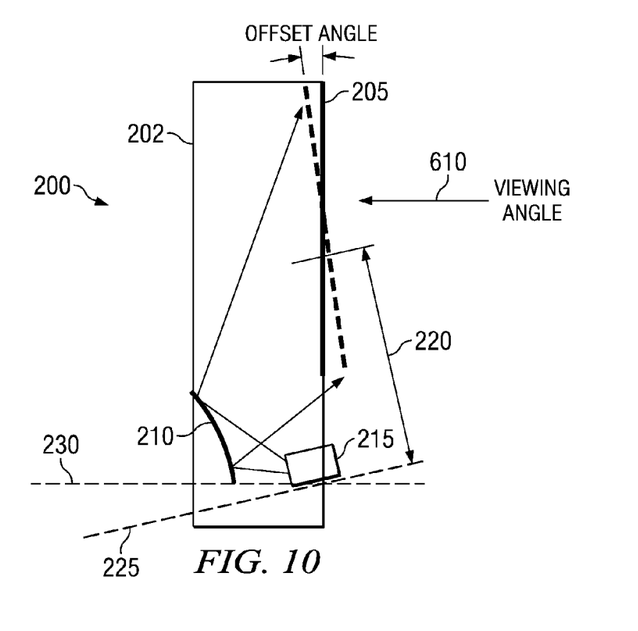
FIG. 10 illustrates an off-axis rear projection system having a viewing angle orthogonal to the display plane in a housing in accordance with an embodiment.

FIG. 10 illustrates an embodiment similar to that illustrated in FIG. 7, except that the projection system 215 together with the folding mirror 210, rather than the display plane 205, is rotated such that a viewing angle normal to the display plane 205 is maintained. It should be appreciated that the barrel distortion may be corrected by tilting either the projection system 215 (including the folding mirror 210) or the display plane 205. In another embodiment, both of the projection system 215 and the display plane 205 are tilted. Any combination of tilting the projection system 215, the folding mirror 210, and/or the display plane 205 may be used to achieve the desired offset of the optical axis of the projection system 205 relative to the display plane 205.

Figure 11:
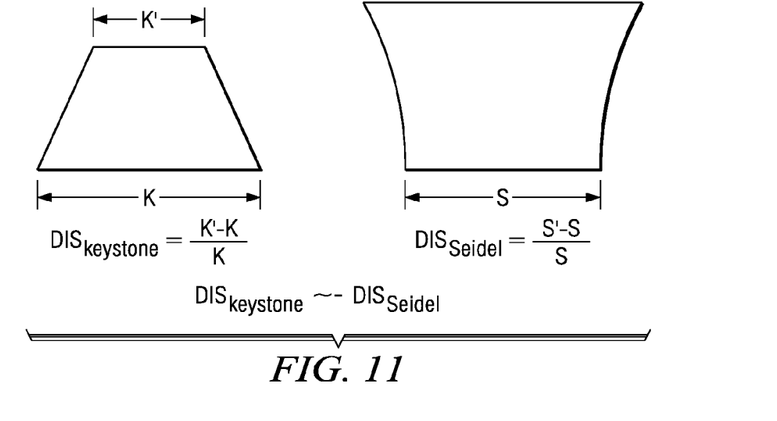
FIG. 11 illustrates the relationship between a Seidel aberration and a keystone distortion in accordance with an embodiment.

In a preferred embodiment, the size of the keystone distortion induced by tilting the display plane, the projection system, and/or the spatial light modulator is approximately equivalent to the inverse of the size of the third-order residual distortion caused by the optics. FIG. 11 illustrates an example of this preferred embodiment in the context of a pincushion type of distortion in accordance with an embodiment.

As illustrated in FIG. 11, a distortion value for the keystone compensation $DIS_{keystone}$ may be determined by dividing the difference between the upper width of the keystone distortion K' and the lower width of the keystone distortion K by the width of the lower keystone distortion width K, thereby determining the difference between the upper and lower dimensions as a percentage of the lower dimension. A distortion value of the pincushion distortion $DIS_{Seidel}$ may be determined in a similar manner by dividing the difference between the upper width of the pincushion distortion S' and the lower width of the pincushion distortion S by the width of the lower pincushion distortion width S, thereby determining the difference between the upper and lower dimensions as a percentage of the lower dimension. Because the relative shapes are opposite one another (e.g., the negative keystone is wider along the bottom while the pincushion is wider along the top), the distortion value for the keystone compensation $DIS_{keystone}$ is preferably approximately equal to the inverse of the distortion value of the pincushion distortion $-DIS_{Seidel}$.

Figure 12:
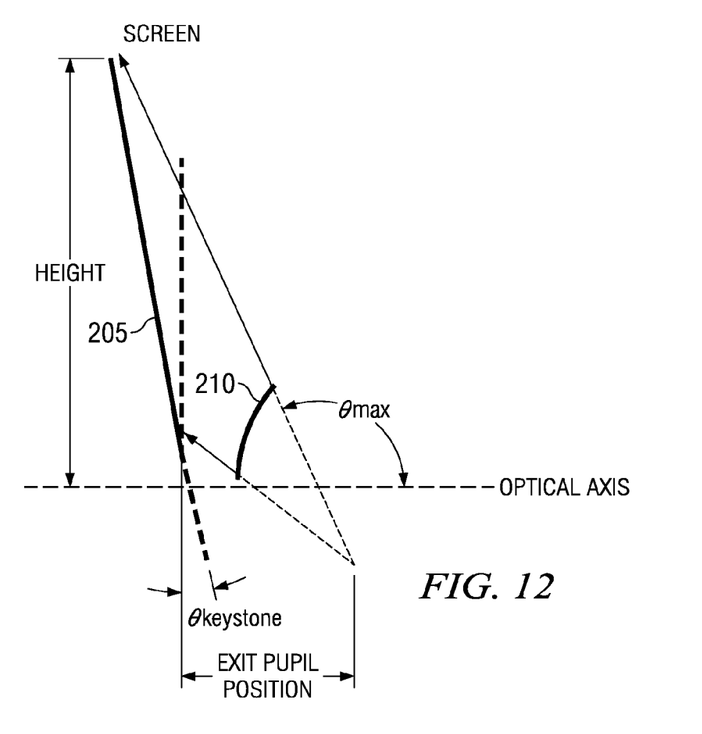
FIG. 12 illustrates the relationship between a screen tilt angle and exit pupil position in accordance with an embodiment.

FIG. 12 illustrates the general relationship between the distortion and the tilt angle of the display screen as a function of the projection lens FOV in accordance with an embodiment. The height represents the vertical distance from the top of the screen to the optical axis of the projection system. With reference to FIG. 12, the distortion caused by tilting may be expressed by the following equation:

$$Dis(\%) \approx 100 * \left(1 - \eta \frac{\cos(\theta \max) * \cos(\theta keystone)}{\cos(\theta \max + \theta keystone)}\right)$$

where:
  θmax is one-half the FOV of the projection lens from the projection lens optical axis to the top of the display image (vertical field of view);
  η is a factor dependent upon the screen format (f>1) and offset in % as defined below:

$$\eta \sim \frac{100 * f}{2 * \text{offset}}$$

θkeystone is the tilt angle of the screen relative to a plane normal to the optical axis.

As an example, embodiments using a display having a ratio of 16:9 may use an f value of 1.77 and a display having a ratio of 4:3 may use an f value of 1.33. In the embodiment in which a 16:9 display ratio and an offset of 105% are used, then η~0.845.

Given the above equation and the relationship illustrated in FIG. 11, the angle θkeystone may be determined by calculating the $DIS_{Seidel}$ and substituting the DIS(%) with the value of $DIS_{Seidel}$ and solving for θkeystone. One of ordinary skill in the art will appreciate that the relationship provided above is a general relationship and that it may be desirable to adjust the tilt angle from the relationship provided above to optimize the image. For example, if a particular set of optics severely distorts the displayed image, it may be desirable to tilt the screen at a greater angle than indicated by the above relationship in order to provide a greater amount of keystone correction.

Figure 13:
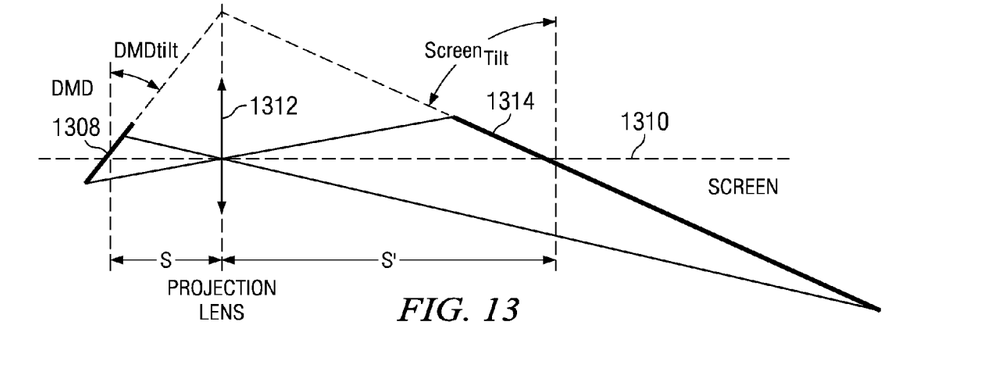
FIG. 13 illustrates a tilted DMD configuration in accordance with an embodiment.
Figure 14A:
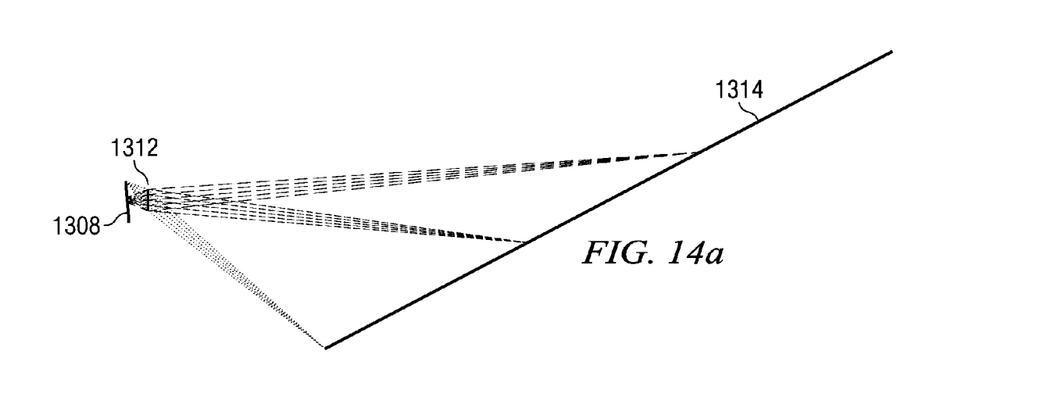
FIGS. 14a and 14b illustrate the effect of tilting the DMD on an image in accordance with an embodiment.
Figure 14B:
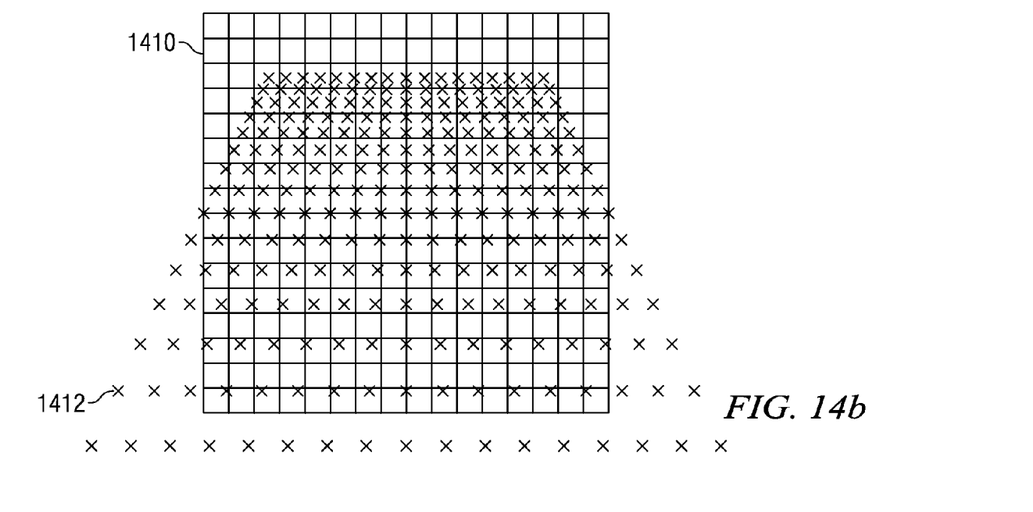

FIGS. 13, 14a, and 14b illustrate a tilting of the spatial light modulator (e.g., the DMD 105 in this case) in order to induce a keystone effect in accordance with an embodiment. This embodiment takes advantage of the Scheimpflug principle, which introduces a keystone while maintaining focus across the entire image. As illustrated in FIG. 13, the DMD 1308 is tilted $DMD_{tilt}$ relative to a plane normal to an optical axis 1310 of the projection lens 1312. According to the Scheimpflug principle, a display screen 1314 is tilted $Screen_{Tilt}$ relative to a plane normal to the optical axis 1310, such that the plane of the DMD 1308 and the plane of the display screen 1314 intersect in the principle plane of the projection lens 1312. The alignment of the DMD 1308 and the display screen 1314 relative to the projection lens 1312 illustrated in FIG. 13 introduces a positive keystone distortion and similar embodiments may be used to correct distortions similar to pincushion distortions. The magnification of the system illustrated in FIG. 13 is represented by S'/S.

FIG. 14a illustrates a ray trace of a projection system in which the DMD 1308 is tilted relative to the projection lens 1312 to introduce a negative keystone effect on the display screen 1314. In this embodiment, the $DMD_{Tilt}$ is approximately 5 degrees and the $Screen_{Tilt}$ is approximately 62 degrees with a magnification of approximately −24. The corresponding keystone effect is illustrated in FIG. 14b, wherein a grid 1410 represents the ideal pixel positions and the "x" represents the corresponding pixel locations of the displayed image.

Figure 15:
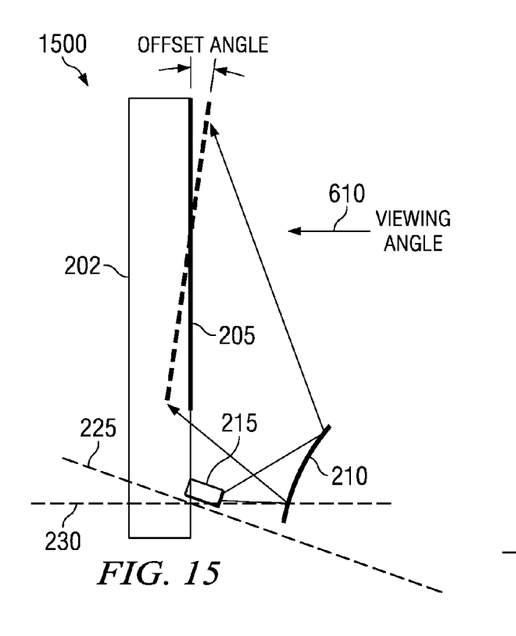
FIG. 15 illustrates a front-projection system in accordance with an embodiment.

FIG. 15 illustrates a front projection system 1500 in accordance with an embodiment. It should be appreciated that while the embodiments discussed above are rear projection systems, other embodiments may be used to provide a front projection system, such as that illustrated in FIG. 15. In particular, FIG. 15 illustrates a front projection system 1500 similar to the rear-projection system 200 of FIG. 2a, wherein like reference numerals refer to like elements, except that the projection system 215 and the folding mirror 210 are placed in front of the display plane 205. It should be appreciated that in this manner the housing 202 may be thin, or in some embodiments in which the projection optics and/or the DMD is tilted rather than the display screen 205, the housing 202 may not be used and a wall or other existing surface may be used as the display plane 205. The electronics and optics of the front projection system 1500, such as the projection system 215 and the folding mirror 210, may be enclosed in a housing (not shown) separate from or part of the housing 202.

Figure 16:
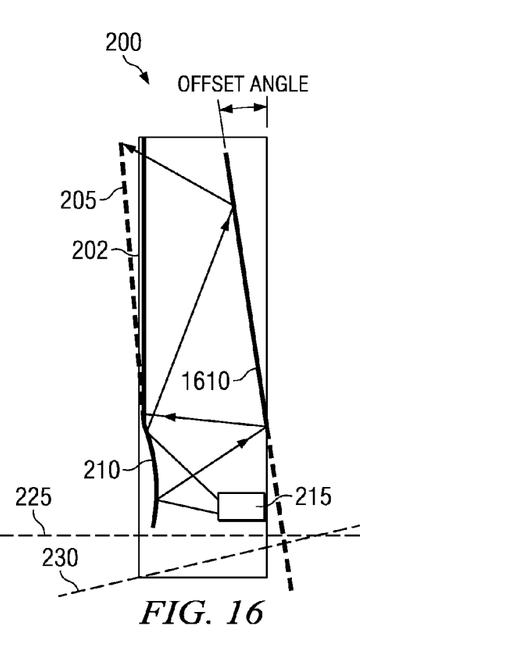
FIG. 16 illustrates a rear-projection system with a tilted folding mirror in accordance with an embodiment.

FIG. 16 illustrates an embodiment in which a keystone distortion is introduced by tilting a folding mirror. In particular, FIG. 16 illustrates an embodiment in which a planar folding mirror 1610 is placed between the folding mirror 210 and the display plane 205. By tilting the folding mirror 1610 such that the folding mirror 1610 is non-orthogonal to the optical axis of the projection system 215, a keystone distortion is caused in the displayed image on the display plane 205 without tilting the display plane 205. It should be noted that the folding mirror 1610 may be tilted either direction to cause either a negative keystone distortion or a positive keystone distortion.

It should also be noted that FIG. 16 illustrates the folding mirror 1610 inducing the keystone effect is placed between the folding mirror 210 and the display plane 205 for illustrative purposes only, and that the folding mirror 1610 may be placed in other locations to induce the keystone effect. For example, the folding mirror 1610 may be placed between the DMD 205 and the projection system 215 (see FIG. 2a).

Figure 17:
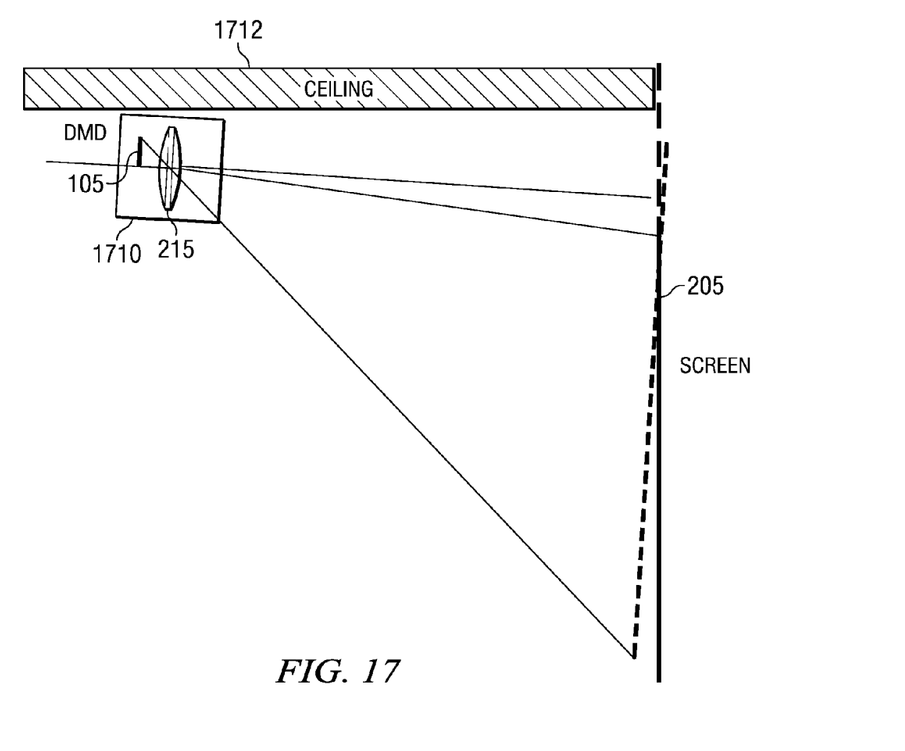
FIG. 17 illustrates another front-projection system in accordance with an embodiment.

FIG. 17 illustrates another embodiment of a front projection system that may utilize the concepts and features discussed above. In this embodiment, an off-axis configuration is utilized to mount a front projection system 1710 on a ceiling 1712 for displaying an image (not shown) on the display plane 205. The display plane 205 may be an existing surface or wall or a separate display screen. If the display plane 205 is a separate display surface that is movable, then it may be feasible to tilt the angle of the display plane 205. In other embodiments in which the display plane 205 is not movable or it is more desirable to maintain a substantially upright display plane 205, it may be more desirable to tilt the front projection system 1710, including the DMD 105 and/or the projection lens system 125, relative to the optical axis of the projection optics 215 as discussed above.

It has been found that embodiments such as those discussed above are particularly useful in correcting projection systems, both front and rear projection systems, in which the optics exhibit a third-order residual distortion, preferably without parabolic compensation. In these embodiments, inducing the keystone distortion by tilting the relative angle between the projection system and the display plane reduces the cubic distortion by a linear function, thereby resulting in a more uniform and less noticeable distortion.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A rear-projection image display system, comprising:
    a display screen having a display plane with a vertical height and a vertical height center;
    a folding mirror;
    a projection system having a projection optical axis; and
    a housing enclosing the display plane, folding mirror and projection system;
    wherein the folding mirror is positioned relative to the display plane and the projection system for folding the projection optical axis by reflecting light projected rearwardly from the projection system onto itself and onto the display plane;
    wherein the projection system is positioned relative to the display plane with a vertical offset between the projection optical axis and the vertical height center of the display plane by an optical offset that is about one-half or greater than the vertical height of the display plane; and
    wherein the display plane is tilted relative to a plane orthogonal to the projection optical axis by a vertical offset angle to induce a keystone distortion in the displayed image which substantially compensates for a pincushion or barrel distortion in the orthogonal plane.

2. The system of claim 1, wherein the optical offset is about one-half the vertical height.

3. The system of claim 1, wherein the vertical offset angle is about 0.12°.

4. The system of claim 1, wherein the keystone distortion is a negative keystone distortion that substantially compensates for a pincushion distortion in the orthogonal plane.

5. The system of claim 1, wherein the keystone distortion is a positive keystone distortion that substantially compensates for a barrel distortion in the orthogonal plane.

6. The system of claim 1, wherein the induced keystone distortion is determined by the relationship:

$$Dis(\%) \approx 100 * \left(1 - \eta \frac{\cos(\theta max) * \cos(\theta keystone)}{\cos(\theta max + \theta keystone)}\right);$$

where $\theta max$ is one-half a field of view of a projection lens of the projection system from the projection system optical axis to a top of a displayed image vertical field of view; $\eta$ is a factor dependent upon a display screen format (f>1) and offset in % defined by $$\eta \sim \frac{100 * f}{2 * \text{offset}};$$

and $\theta keystone$ is the vertical offset angle.

7. The system of claim 2, wherein the vertical offset angle is about 0.12°.

8. The system of claim 7, wherein the keystone distortion is a negative keystone distortion that substantially compensates for a pincushion distortion in the orthogonal plane.

9. The system of claim 7, wherein the keystone distortion is a positive keystone distortion that substantially compensates for a barrel distortion in the orthogonal plane.

* * * * *